United States Patent [19]

Pendergraft et al.

[11] Patent Number: 5,112,661
[45] Date of Patent: May 12, 1992

[54] MACHINE INSULATION JACKET ASSEMBLY

[76] Inventors: Gordon M. Pendergraft, 10425 E. 111th St. S., Mulvane, Kans. 67110; John R. Pendergraft, 1023 Foulk Dr., Belle Plaine, Kans. 67013; Dan Sherrill, 2213 Timberglen Dr., Flower Mound, Tex. 75028

[21] Appl. No.: 543,105

[22] Filed: Jun. 25, 1990

[51] Int. Cl.$^5$ .................................. F16L 9/14
[52] U.S. Cl. ........................... 428/36.91; 428/36.9; 428/76; 428/34.5; 138/149; 138/151
[58] Field of Search ............... 428/36.9, 36.91, 76, 428/34.5; 138/147, 149, 151

[56] References Cited

U.S. PATENT DOCUMENTS 3,941,159  3/1976  Toll ........................... 138/147
4,009,735  3/1977  Pinsky ........................ 138/147

FOREIGN PATENT DOCUMENTS 40770  9/1929  Denmark .

Primary Examiner—Patrick J. Ryan
Assistant Examiner—Kam F. Lee
Attorney, Agent, or Firm—Phillip A. Rein

[57] ABSTRACT

This invention relates to a machine insulation jacket assembly which can be mounted on an injection heater barrel utilized in plastic molding machines that operate to handle high temperature molded plastic for forming the into molded plastic parts. The machine insulation jacket assembly includes a primary jacket assembly used in conjunction with an end cover jacket assembly to be mounted about and enclose the ejection heater barrel. The primary jacket assembly includes a main support body member interconnected in a mounted condition through a plurality of connector strap members. The main support body member is provided with outer and inner wall sections having an insulation body section mounted therebetween. The connector strap members are operable in order to engage and hold the main support body member in a clamped and sealed condition about the injection heater barrel. The end cover jacket assembly includes an end support body member secured through a connector assembly in the enclosed condition and having a shaft cover assembly usable therewith. The end support body member is to be placed about and against an end portion of the injection heater barrel while engaging a portion of the primary jacket assembly in a sealed manner. The shaft cover assembly is a replaceable item which is releasably connected to the end support body member and having a central opening therein to receive a spindle shaft member therethrough.

19 Claims, 3 Drawing Sheets

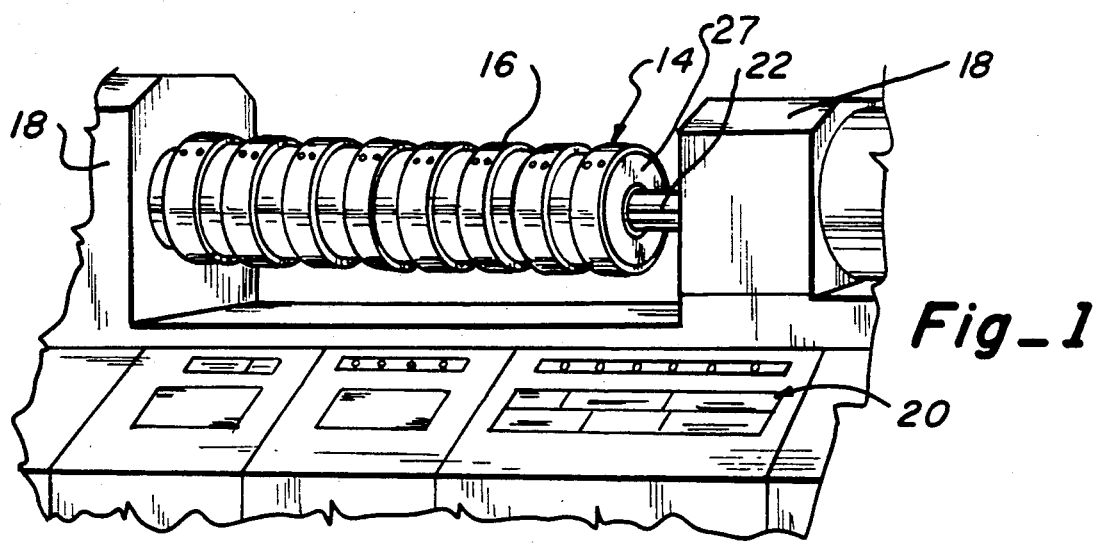
Fig_1
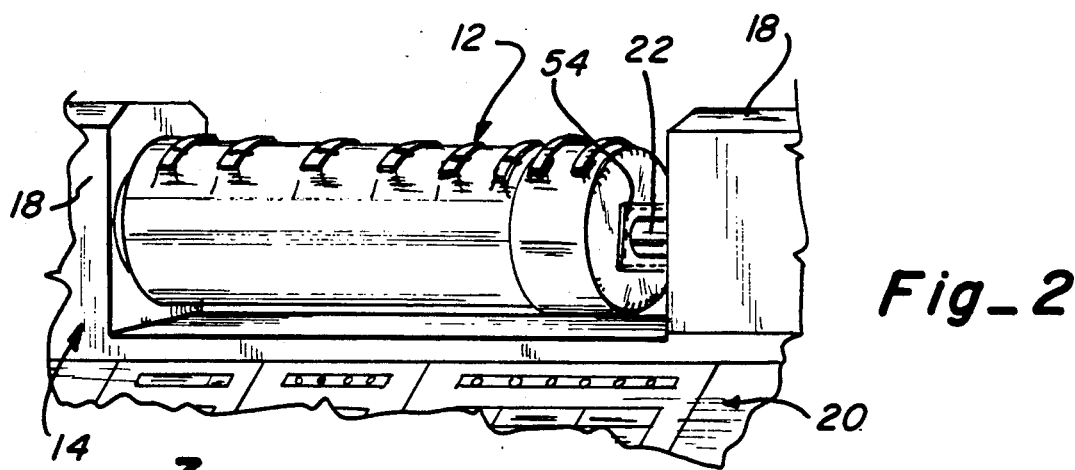
Fig_2
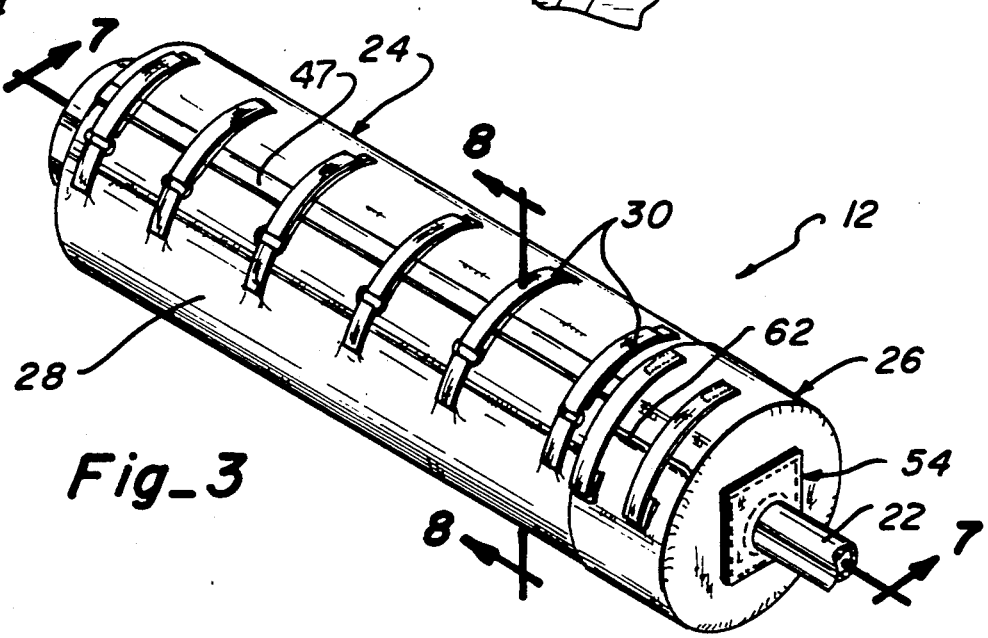
Fig_3

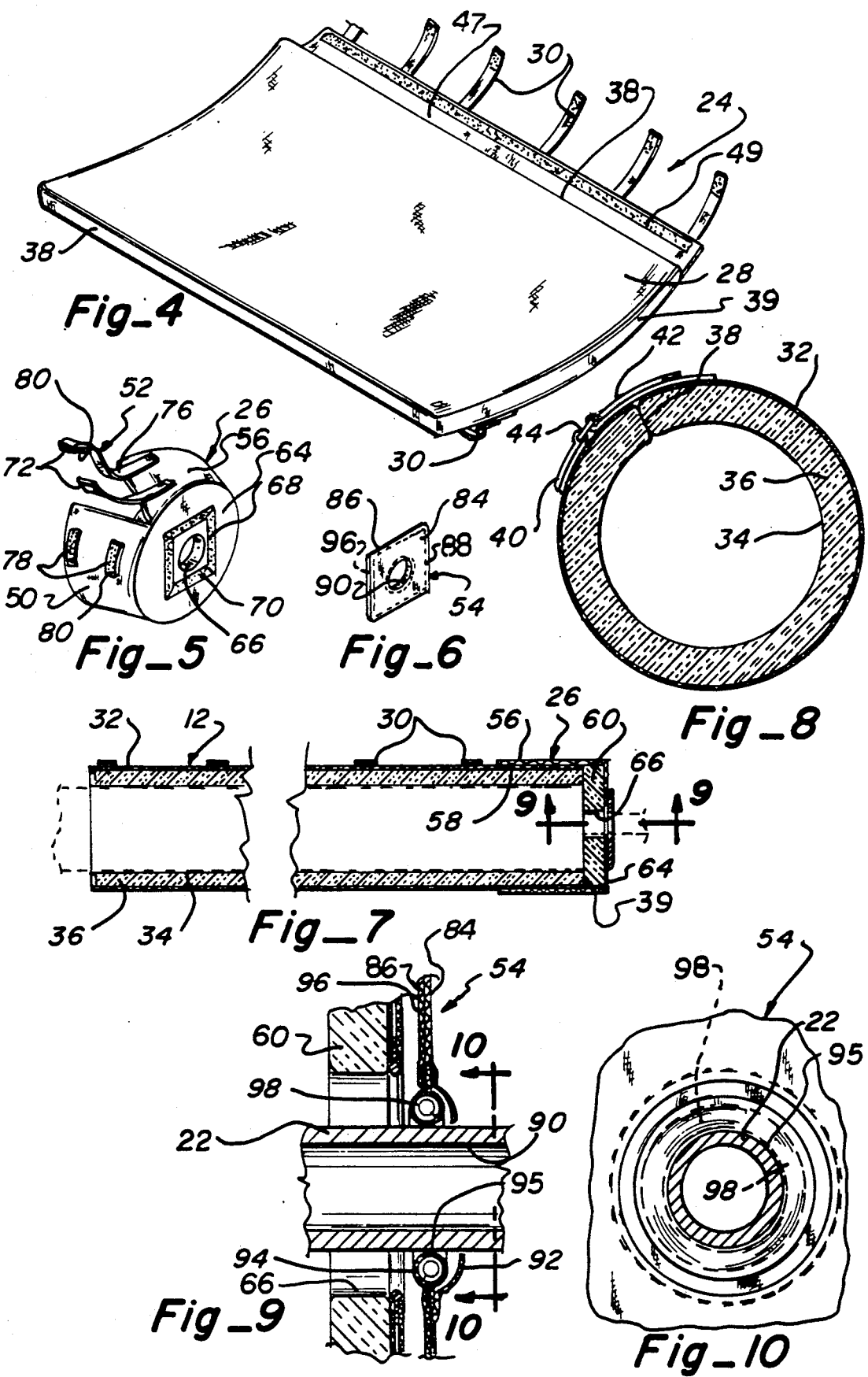

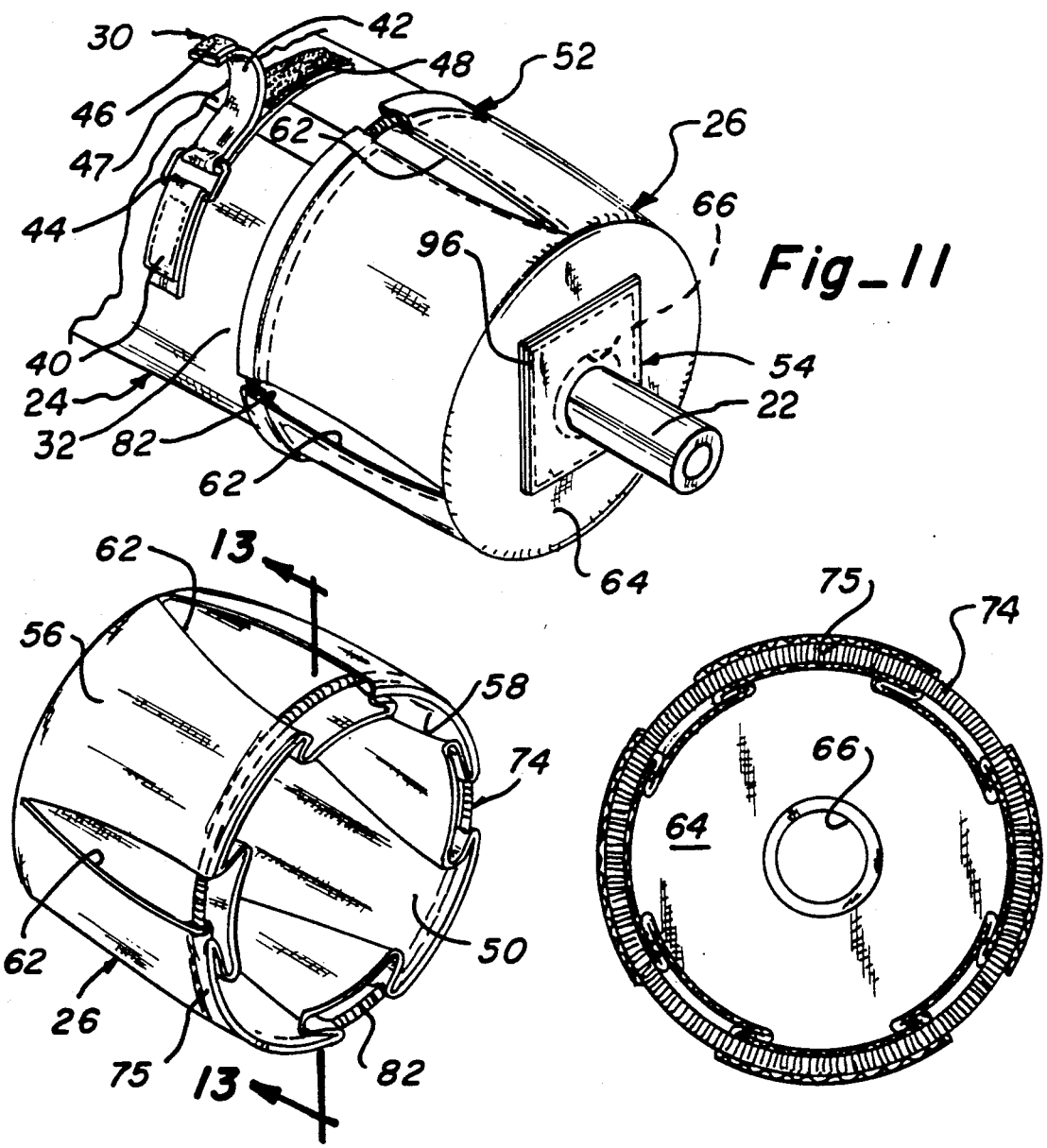
Fig_11
Fig_12
Fig_13

MACHINE INSULATION JACKET ASSEMBLY

PRIOR ART

A patent search on this invention revealed the following United States patents:

| U.S. Pat. No. | Invention | Inventor |
|---|---|---|
| 2,768,420 | PROTECTIVE COVERING | Leslie A. Runton |
| 3,000,433 | THERMAL INSULATION FOR PIPE | Ray T. Kemper |
| 3,265,041 | MULTI-TANK WATER HEATER | Joseph H. McCarthy, Jr. |
| 3,589,971 | INSULATION JACKETS FOR INSTRUMENTS | Sheridan J. Reed |
| 3,907,486 | MEANS FOR INTERNALLY COOLING BRIQUETTING MACHINE ROLLS AND SEGMENTS | Frank Kennedy |
| 3,941,159 | INSULATION ASSEMBLY FOR A TUBULAR CONDUIT PIPE | Wolcott Toll |
| 4,009,735 | THERMAL INSULATION | Gordon P. Pinsky |
| 4,073,317 | ADJUSTABLE CLAMPING DEVICE | James B. Ellis |
| 4,110,876 | JET MUFFLER | Weiss et al |
| 4,619,553 | HIGH TEMPERATURE OIL BOOM COVER BLANKET | Edward M. Fischer |

The Runton patent discloses a protective covering utilizing "shredded TEFLON" as a packing and teaches the use thereof as a bulletproof type jacket.

The Kemper patent discloses a thermal insulation structure adapted to be placed about a pipe member and having a plurality of spaced connector strap members.

The McCarthy, Jr. patent discloses an insulation jacket mounted about a plurality of water heaters.

The Reed patent discloses an insulation jacket utilizing snap members and outer inward covers placed about adjacent pipe members.

The Kennedy patent discloses a means for internally cooling briquetting machine rolls.

The Toll patent discloses an insulation cover using velcro fasteners.

The Pinsky patent discloses a thermal insulation for nuclear reactor power plants operable to withstand temperatures up to 700 degrees F. This patent discloses a high temperature insulating structure which can withstand wetting and drying, high temperatures, and utilizes velcro straps as connecting members.

The Ellis patent discloses an insulation cover having an adjustable clamping device thereon.

The Weiss et al patent discloses a jet muffler having an insulation material being used to muffle sounds.

The Fischer patent discloses a high temperature insulation cover for oil booms and utilizes a fiberglass insulation and having disclosed numerous types of outer covers.

PREFERRED EMBODIMENT OF THE INVENTION

In one preferred embodiment of this invention, a machine insulation jacket assembly is operable to be placed on and about heating elements on a plastic molding machine. The plastic molding machine has spaced main support spindle members having mounted therebetween an injection heater barrel which is heated to high temperatures to maintain plastic in a molded state for injection of plastic parts. The function of the machine insulated jacket assembly of this invention is to enclose the injection heater barrel to reduce heat loss to adjacent area; achieve monetary savings by reducing air conditioning bills; and control heat loss during the molding process. The machine insulation jacket assembly includes a primary jacket assembly used in conjunction with an end cover jacket assembly. The primary jacket assembly includes a main support body member releasably mounted about the injection heater barrel through the use of connector strap members. The main support body member includes 1) an outer wall section; 2) an inner wall section; 3) an insulation body section mounted between the outer and inner wall sections; and 4) end wall sections. The main support body member is wrapped about the injection heater barrel with the end wall sections placed in an abutting relationship for heat loss sealing purposes. The connector strap members include a plurality thereof spaced longitudinally of the main support body member, each having a stationary strap section and a moveable strap section interconnected through a connector clamp. The inner and outer wall sections are constructed of a TEFLON type material so that heated, molten, plastic material will not adhere thereto. The end cover jacket assembly includes an end support body member held in a mounted condition on the injection heater barrel by a connector assembly and including a shaft cover assembly usable therewith. The end support body member includes outer and inner wall sections having an insulation body section mounted between a portion thereof. The end support body member is provided with tuck sections and an integral end wall section. The tuck sections allow for expansion and placing about an end section of the injection heater barrel. The end wall section is provided with a central shaft opening and having thereabout a connector portion for engagement with the shaft cover assembly. The connector assembly, in one embodiment, involves connector strap members having a moveable strap section engagable with a connector section and interconnected by velcro members. In another embodiment of the connector assembly used with the end cover jacket assembly, a bias connector member is provided being a coil spring member mounted within a connector loop. The coil spring member operates to bias the inner wall section into a clamped engagement against the primary jacket assembly to provide a heat loss sealing function therewith. The shaft cover assembly includes inner and outer wall sections; a connector section; a central shaft opening; and a cover flap member. The cover flap member is engagable with a spindle shaft member of the injection heater barrel to provide a seal therewithin. A bias member is provided having spring member mounted within the inner wall section and provides a spring loaded contact with the spindle shaft member of the support spindle member of the plastic molding machine. The connector section is provided with velcro material which is engagable with the velcro material on the connector portion of the end wall section of the end cover jacket assembly to achieve a heat sealing function.

OBJECTS OF THE INVENTION

One object of this invention is to provide a machine insulation jacket assembly operable to be placed about an injection heater barrel on a plastic molding machine in order to 1) prevent heat loss from the injection heater barrel to reduce heating expense; 2) provide an outer surface which will not allow molded plastic to adhere thereto; and 3) provide an insulation cover to reduce air conditioning bills required in the surrounding area.

Another object of this invention is to provide a machine insulation jacket assembly provided with 1) a primary jacket assembly to be mounted about the injection heater barrel on the plastic molding machine; and 2) an end cover jacket assembly operable to be mounted about a spindle shaft member and against an end portion of the injection heater barrel to provide heat retention therein while achieving a sealing action with the spindle shaft member.

One other object of this invention is to provide a machine insulation jacket assembly having a primary jacket assembly with a main support body member with inner and outer wall sections enclosing an insulation body section and having connector strap members in order to releasably connect the primary jacket assembly about the injection heater barrel on the plastic molding machine to provide an insulation heat sealing function therewith.

One further object of this invention is to provide a machine insulation jacket assembly including an end cover jacket assembly mounted about an end wall and injection nozzle or shaft of the injection heater barrel on the plastic molding machine and provided with an end wall section mounted about the nozzle or shaft and having bias means to provide a seal therewith.

Still, one other object of this invention is to provide a machine insulation jacket assembly to be mounted about the injection heater barrel on the plastic molding machine which is economical to manufacture; simple to adjust and install; constructed of a special material which will not permit molded plastic from adhering thereto; substantially maintenance free; and providing new and novel sealing structures in order to keep heat loss from the injection heater barrel at a minimum.

Various other objects, advantages, and features of the invention will become apparent to those skilled in the art from the following discussion, taken in conjunction with the accompanying drawings, in which:

FIGURES OF THE INVENTION

FIG. 1 is a fragmentary perspective view of a plastic injection molding machine on which a machine insulation jacket assembly of this invention would be attached;

FIG. 2 is a view similar to FIG. 1 illustrating the machine insulation jacket assembly of this invention mounted on the plastic injection molding machine;

FIG. 3 is a perspective view of the injection heater barrel as removed from the plastic injection molding machine and having the machine insulation jacket assembly of this invention mounted thereon;

FIG. 4 is a perspective view of a primary jacket assembly of the machine insulation jacket assembly of this invention;

FIG. 5 is a perspective view of an end cover jacket assembly of the machine insulation jacket assembly of this invention;

FIG. 6 is a perspective view of a shaft cover assembly of the end cover jacket assembly of this invention;

FIG. 7 is a reduced foreshortened sectional view taken along line 7—7 in FIG. 3;

FIG. 8 is an enlarged sectional view taken along line 8—8 in FIG. 3;

FIG. 9 is an enlarged fragmentary sectional view taken along line 9—9 in FIG. 7;

FIG. 10 is a fragmentary elevational view taken along line 10—10 in FIG. 9;

FIG. 11 is a fragmentary perspective view of an end portion of the injection heater barrel having a machine insulation jacket assembly of this invention mounted thereon and illustrating a second embodiment of an end cover jacket assembly utilized therewith;

FIG. 12 is a perspective view of the second embodiment of the end cover jacket assembly as shown in FIG. 11; and FIG. 13 is a sectional view taken along line 13—13 in FIG. 12.

The following is a discussion and description of preferred specific embodiments of the machine insulation jacket assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and in particular to FIG. 1, a machine insulation jacket assembly of this invention, indicated generally at 12, is shown as mounted on a plastic molding machine 14. The purpose and function of the machine insulation jacket assembly 12 is to insulate an injection heater barrel 16 which is an exposed large part of the plastic molding machine 14 to prevent heat loss therefrom and thus achieve substantial energy cost savings.

As noted in FIG. 1, the plastic molding machine 14 includes the injection heater barrel 16 mounted and supported at opposite ends on support spindle members 18 and having a main control panel 20 associated therewith for proper machine operation. The injection heater barrel 16 is connected at one end by the left sided spindle support member 18 (FIG. 1) and a spindle shaft member 22 which is mounted on the other support spindle member 18. A molten plastic material is forced through the injection heater barrel 16 for use in a conventional plastic injection molding operation. In many cases, the molten plastic material is ejected or leaks from the injection heater barrel 16 and it is desirable to contain the molten plastic material which is achieved by the machine insulation jacket assembly 12 of this invention. The molded plastic is of extremely high temperatures and the heat normally radiates continuously from the injection heater barrel 16 to the surrounding work area.

The machine insulation jacket assembly 12 includes 1) a primary jacket assembly 24 to be mounted about an outer exterior of the injection heater barrel 16; and 2) an end cover jacket assembly 26 to be mounted about one end portion of the primary jacket assembly 24 and an end wall 27 of the injection heater barrel 16 and enclose the spindle shaft member 22 in a sealing manner.

The primary jacket assembly 24 includes a main support body member 28 held in an enclosed or usage condition by a plurality of connector strap members 80. The main support body member 28 includes 1) an outer wall section 32; 2) an inner wall section 34; 3) an insulation body section 36 mounted between the outer and inner wall sections 32, 34; 4) side wall sections 38 operable to abut each other and join end portions of the insulation body section 36; and 5) an end wall section 39 to be placed adjacent the end wall 27 of the injection heater barrel 16.

The outer and inner wall sections 32, 34 are constructed of a special TEFLON (a trademark used to identify a plastic material known as polytetrafloroethylene) coated material, a silicone coated fabric, or a ceramic coated material which will not permit the hot molten injection molding plastic material to adhere thereto. It is found that this material used for the outer and inner wall sections 32, 34 can be of as material which is adapted not only to withstand extremely high temperatures without disintegrating or deteriorating but also provide assistance in preventing heat loss through the insulation body section 36.

Each connector strap member 30 includes 1) a stationary strap section 40 secured to an outer surface of the outer wall section 32 of the main support body member 28; 2) a moveable strap section 42 secured at one end to an opposed opposite portion of the outer Wall section 32 of the main support body member 28; and 3) a connector clamp 44 engaged and held in one position by the stationary strap section 40 and engagable by the moveable strap section 42 as will be explained. The connector clamp 44 is of a generally rectangular ring shape of metal construction.

Each moveable strap section 42 is provided with hook and loop velcro portions 46, 48 which are engagable with each other to hold the connector strap member 80 in its interconnected position as best noted in FIG. 11. Also, it is noted that an outer extended edge 47 of the outer wall section 32 is provided with an elongated velcro strip 49 which is engagable with a like velco strip on the opposed edge of the outer wall section 32 to form an overlapping interconnected velcro sealed connection using hook and loop velcro portions 46, 48 to achieve the end resultant interconnected structure as noted in FIG. 3.

The end cover jacket assembly 26 includes 1) an end support body member 50; 2) a connector assembly 52 to releasably enclose the end support body member 50 about an end portion of the primary jacket assembly 24 and the injection heater barrel 16; and 3) a shaft cover assembly 54 (FIG. 6) engagable with the end support body member 50 and adapted to be placed about the spindle shaft member 22 of the plastic molding machine 14 for sealing functions as will be described.

The end support body member 50 includes 1) an outer wall section 56: 2) an inner wall section 58; 3) an insulation body section 60 mounted between the outer and inner wall sections 56 58 at an end wall location; 4) tuck sections 62 to provide initial looseness to fit about and enclose an end portion of the injection heater barrel 16; and 5) an end wall section 64. The tuck sections 62 may not be used in the embodiment shown in FIGS. 2, 3, and 5.

As noted in FIG. 7, the insulation body section 60 engages the end wall 39 of the insulation body section 36 of the main support body member 28 of the primary jacket assembly 24 to provide a sealed insulation contact fit therewith.

The end wall section 64 is provided with central shaft opening 66 and an outer connector portion 68. The outer connector portion 68 is of a generally square shape having a velcro connector 70 thereon for attachment to the shaft cover assembly 54 as will be explained.

The outer and inner wall sections 56, 58; tuck sections 62; and end wall section 64 are constructed of a highly heat-resistant material such as silicone, ceramic or TEFLON material as noted for the primary jacket assembly 24, all of which can withstand extreme temperatures of the molded plastic without deterioration or damage and, additionally, the molded plastic material, even after cooling, will not adhere to a surface thereof.

The connector assembly 52, as noted in FIG. 5, includes a moveable strap section 76 secured at one end to a outer surface of the wall section 56 of the end support body member 50 and a connector section 78 secured to an opposed portion of the outer wall section 56 in alignment with the moveable strap section 76. The moveable strap section 76 is provided with a velcro connector portion 80 on an inner surface thereof which is engagable with a similar velcro connector portion 80 on the connector section 78. This provides an obvious adjustable interconnection with the cooperating hoop and loop type velcro connector portions 80 in a conventional manner. This structure is shown in the interconnected condition as noted in FIG. 3.

The connector assembly 52 is provided with a second embodiment as noted collectively in FIGS. 11-13, inclusive, whereupon, instead of the connector strap member 72, is provided a bias connector member 74 mounted with a connector loop 75 formed by an inner portion of the end support body member 50. The bias connector member 74 is a continuous circular coil spring member 82 which has been placed within the connector loop 75. Numerous tuck sections 62 are operable to provide and complete enclosure whereupon the coiled spring member 82 can be expanded for slipping about an end area of the primary jacket assembly 24 and the injection heater barrel 16 as noted in FIG. 11.

The shaft cover assembly 54 is of generally square shape provided with 1) an outer wall section 84; 2) an interconnected inner wall section 86; 3) a connector section 88; 4) a central shaft opening 90 to receive the spindle shaft member 22 therethrough; 5) a cover flap member 92 to provide an overlapping shield structure; and 6) a bias member 94 mounted within an enclosure loop 95 formed by the outer wall section 84 and the inner wall section 86.

The connector section 88 is provided with a velcro connector 96 which is engagable with the velcro connector 70 on the connector portion 68 of the end wall sections 64 of the end support body member 50.

The bias member 94 includes a circular spring member 98 which is mounted within the enclosure loop 95 of the outer wall section 84 and operable to snugly engage an outer surface of the spindle shaft member 22 as best noted in FIG. 9

USE AND OPERATION OF THE INVENTION

In the use and operation of the machine insulation jacket assembly 12 of this invention, it is noted that the injection heater barrel 16 can be disengaged from the right hand one (FIG. 1) of the spindle support member 18 for attachment of this invention thereto.

First, the primary jacket assembly 24 is positioned in the open condition as noted in FIG. 4 and placed about an outer surface of the injection heater barrel 16. The length of the main support body member 28 is such as to completely enclose and contact the outer surface and full length of the injection heater barrel 16. The end wall section 39 and end wall 27 of the injection heater barrel 16 are in a common plane. Next, the side wall sections 38 are placed in an abutting relationship with the extended edge 47 covering the crack therebetween and the connector strap members 30 are interconnected as noted in FIG. 3.

Each connector strap member 80 is readily interconnected by insertion of the moveable strap section 42 through an open portion of the respective connector clamps 44. Thereupon, the respective moveable strap section 42 is pulled backwardly over itself to interconnect the velcro portions 46, 48 and receive a firm abutting of the side wall sections 38 and, in conjunction with outer flap edge 47, to achieve an air tight insulation cover.

Next, the end cover jacket assembly 26 is placed over and about the spindle shaft member 22 with the end wall section 64 contacting and abutting the end wall section 39 of the primary jacket assembly 24. This places the insulation body section 60 into an abutting relationship with the insulation body section 36 as noted in FIG. 8. Thereupon, the connector assembly 52 with the connector strap members 72 can be interconnected through the use of the velcro connector portions 80 with the moveable strap section 68 and connector section 78 to achieve the enclosed condition as noted in FIG. 3.

In the alternative, the second embodiment of the connector assembly 52 can be utilized with the coiled spring member 82 to achieve an inwardly bias contact between the inner wall section 58 and the adjacent portion of the outer wall section 32 of the primary jacket assembly 24 as noted in FIG. 11.

Next, the shaft cover assembly 54 is placed with the central shaft opening 90 about the spindle shaft member 22 and moved inwardly into an abutting condition with the end wall section 64 of the end support body member 50. The shaft cover assembly 54 is rotated so as to align the contact of the velcro connector 70 on the connector portion 68 with the velco connector 96 on the connector section 88 of the shaft cover assembly 54. This provides a sealing relationship between the velcro connectors 70, 96 to connect together and prevent relative movement therebetween.

As noted in FIGS. 9 and 10, the shaft cover assembly 54 with the bias member 94 or coiled spring member 98 within the loop 95 is operable to achieve a seal with the spindle shaft member 22 to prevent the escape of heat loss therefrom.

It is noted that the shaft cover assembly 54 is constructed so as to be readily removed and replaced as required due to eventual wearing out and fatigue of the fabric material contacting the spindle shaft member 22.

It is noted that the machine insulation jacket assembly of this invention can be constructed of various diameters, lengths, and sizes to fit various sizes and shapes of injection heater barrels utilized with plastic molding machines. The thickness of the respective insulation is chosen to achieve the desired insulation factor to retain the heat therewithin. The retention of heat acts to achieve a more uniform plastic molding part operation which is critical so that uniform plastic injection parts can be produced therefrom. Additionally, the machine insulation jacket assembly saves considerable energy costs by not radiating heat into the surrounding atmosphere and work area.

Furthermore, the dispensing of this extreme heat to the surrounding area presents an uncomfortable hot condition for the operator of the plastic molding machine and such is overcome by the machine insulation jacket assembly 12 of this invention. Concurrently, controlling the radiant heat from the injection molding machine would lower air conditioning required during summer months in order to compensate for the radiant heat dispensed from the injection heater barrel.

While the invention has been described in conjunction with preferred specific embodiments thereof, it will be understood this description is intended to illustrate and not to limit the scope of the invention, which is defined by the following claims:

I claim:

1. A machine insulation jacket assembly operable to engage, surround, and enclose a heater element on a machine, comprising:
   a) a primary jacket assembly including a main support body member having an inner wall section, and outer wall section, and an insulation body section mounted therebetween;
   b) said inner and outer wall sections constructed of a heat resistant material which is not damaged by contact with a high temperature material and which will not adhere thereto;
   c) said primary jacket assembly having connector strap members secured to said outer wall section and operable to hold said main support body member in a secure closed sealed manner about the heater element; and
   d) said inner and outer wall sections constructed of a TEFLON material which are resistant to heat and prevents the high temperature material from adhering thereto.

2. A machine insulation jacket assembly as described in claim 1, including:
   a) an end cover jacket assembly having an end support body member with a connector assembly attached thereto and having a shaft cover assembly;
   b) said end support body member includes an insulation body section covered on opposite sides by inner and outer wall sections and having an end wall section engagable with an end wall of the heater element; and
   c) said end wall section having a shaft opening to receive a spindle shaft member therethrough from the machine and provide a seal therewith.

3. A machine insulation jacket assembly as described in claim 2, wherein:
   a) said connector assembly includes a connector strap member having a moveable strap section secured at one end to said outer wall section and connected to a connector section secured to another portion of said outer wall section to achieve an adjustable clamped action therewith to clamp said end cover jacket assembly about said primary jacket assembly and abutting same and an end wall of the heater element.

4. A machine insulation jacket assembly as described in claim 2, wherein:
   a) said shaft cover assembly having a connector section for attachment against an outer surface of said end support body member of said end cover jacket assembly so as to be releasably connected thereto and having a central shaft opening to receive the spindle shaft member therethough in a sealing engagement.

5. A machine insulation jacket assembly as described in claim 2, wherein:
   a) said connector assembly having a bias connector member mounted within said end support body member and operable to provide a spring pressure against an outer surface of the spindle shaft member for sealing functions therewith.

6. A machine insulation jacket assembly as described in claim 2, wherein:

a) said shaft cover assembly includes inner and outer wall sections and a connection section, said connector section connected to an outer surface of said end support body member surrounding the spindle shaft member so as to provide for a readily attachable, detachable, and replaceable said shaft cover assembly which needs to be periodically replaced because of wear created by contact with the spindle shaft member.

7. A machine insulation jacket assembly as described in claim 6, wherein:
   a) said outer wall section and said inner wall section constructed of a high temperature resistant material operable to prevent adherence of high temperature molten material thereon.

8. A machine insulation jacket assembly as described in claim 6, wherein:
   a) said outer wall section provided with a plurality of spaced tuck sections so as to completely enclose and continuously seal an outer end of the heater element when said end cover jacket assembly is mounted thereover and about a portion of said primary jacket assembly to provide for a thermal seal therewith.

9. A machine insulation jacket assembly operable to engage, surround, and enclose a heater element on a machine, comprising:
   a) an end cover jacket assembly having an end support body member with a connector assembly attached thereto and having a shaft cover assembly;
   b) said end support body member includes an insulation body section covered on opposite sides by inner and outer wall sections and having an end wall section engagable with an end wall of the heater element; and
   c) said end wall section having a shaft opening to receive a spindle shaft member therethrough from the machine and provide a seal therewith.

10. A machine insulation jacket assembly as described in claim 9, wherein:
    a) a primary jacket assembly mounted about the heater element; and
    b) said connector assembly includes a connector strap member having a moveable strap section secured at one end to said outer wall section and connected to a connector section secured to another portion of said outer wall section to achieve an adjustable clamped action therewith to clamp said end cover jacket assembly about said primary jacket assembly and abutting same and an end wall of the heater element.

11. A machine insulation jacket assembly as described in claim 9, wherein:
    a) said shaft cover assembly having a connector section for attachment against an outer surface of said end support body member of said end cover jacket assembly so as to be releasably connected thereto and having a central shaft opening to receive the spindle shaft member therethrough in a sealing engagement.

12. A machine insulation jacket assembly as described in claim 9, wherein:
    a) said connector assembly having a bias connector member mounted within said end support body member and operable to provide a spring pressure against an outer surface of the spindle shaft member for sealing functions therewith.

13. A machine insulation jacket assembly as described in claim 9, wherein:
    a) said shaft cover assembly includes inner and outer wall sections and a connection section, said connector section connected to an outer surface of said end support body member surrounding the spindle shaft member so as to provide for a readily attachable, detachable, and replaceable said shaft cover assembly which needs to be periodically replaced because of wear created by contact with the spindle shaft member.

14. A machine insulation jacket assembly as described in claim 13, wherein:
    a) said outer wall section and said inner wall section constructed of a high temperature resistant material operable to prevent adherence of high temperature molten material thereon.

15. A machine insulation jacket assembly as described in claim 13, wherein:
    a) said outer wall section provided with a plurality of spaced tuck sections so as to completely enclose and continuously seal an outer end of the heater element when said end cover jacket assembly is mounted thereover and about a portion of said primary jacket assembly to provide a thermal seal therewith.

16. A machine insulation jacket assembly operable to engage, surround, and enclose a heater element on a machine, comprising:
    a) an end cover jacket assembly having an end support body member with a connector assembly attached thereto and having a shaft cover assembly; and
    b) said end cover support body member includes an insulation body section covered on opposite sides by inner and outer wall sections and having an end wall section engagable with an end wall of the heater element.

17. A machine insulation jacket assembly as described in claim 16, wherein:
    a) said connector assembly having a bias connector member mounted within said end support body member and operable to provide a spring pressure against an outer surface of the spindle shaft member for sealing functions therewith.

18. A machine insulation jacket assembly as described in claim 9, wherein:
    a) said inner and outer wall sections constructed of a TEFLON material which are resistant to heat and prevents high temperature material such as a molten plastic from adhering thereto.

19. A machine insulation jacket assembly as described in claim 16, wherein:
    a) said inner and outer wall sections constructed of a TEFLON material which are resistant to heat and prevents high temperature material such as a molten plastic from adhering thereto.

* * * * *